United States Patent [19]
Randell

[11] 3,786,901
[45] Jan. 22, 1974

[54] SEALED LUBRICATING SYSTEM MODULE

[75] Inventor: Forrest Thomson Randell, Glasgow, Scotland

[73] Assignee: Weir Pumps Limited, Cathcart, Scotland

[22] Filed: June 2, 1972

[21] Appl. No.: 259,259

[30] Foreign Application Priority Data
June 3, 1971 Great Britain.................. 18,804/71

[52] U.S. Cl............................. 184/6.18, 308/134.1
[51] Int. Cl............................................... F16n 1/00
[58] Field of Search........... 417/406, 407, 408, 409; 184/6.18, 6.28; 123/196 W; 308/134.1

[56] References Cited
UNITED STATES PATENTS

| | | | |
|---|---|---|---|
| 2,393,808 | 1/1946 | Ponomareff | 308/134.1 |
| 2,225,228 | 12/1940 | Neeson | 184/6.28 X |
| 2,793,714 | 5/1957 | Luenberger | 184/6.18 |
| 2,918,986 | 12/1959 | Leipert | 184/6.18 |
| 2,391,512 | 12/1945 | Ponomareff | 308/134.1 X |
| 2,702,093 | 2/1955 | Sherrill | 417/406 X |

Primary Examiner—Manuel A. Antonakas
Attorney, Agent, or Firm—Nathaniel A. Humphries

[57] ABSTRACT

Rotodynamic apparatus includes a pair of spaced upper and lower rotodynamic machines such as for example an upper pump and a lower drive turbine for the pump, and upright shafting drivingly interconnecting the machines.

Lubricated bearing means are provided to support the upright shafting and comprises a closed vessel adapted to permit the extension therethrough of the shafting and which includes upper and lower compartments for bearing lubricant and ducting interconnecting the compartments, upper and lower shaft-engaging bearing devices in the respective compartments, and a lubricant circulator having an inlet communicating with the lower compartment and an outlet communicating with the bearing devices, the arrangement being such that lubricant flows from the lower compartment through the bearing devices into the compartments and overflows from the upper compartment into the lower compartment.

17 Claims, 8 Drawing Figures

SEALED LUBRICATING SYSTEM MODULE

This invention relates to rotodynamic apparatus of the kind including a pair of spaced upper and lower rotodynamic machines, and upright shafting drivingly interconnecting the machines, and particularly to bearing means supporting the upright shafting and lubricated by a medium such as for example, oil or water. The invention is particularly, though by no means exclusively, concerned with such rotodynamic apparatus in which the upper machine is a pump, say for the feed water of a ship's boiler, and the lower machine is a turbine for driving the pump.

The object of the invention is to improve the lubrication of the bearing means.

According to the present invention there is provided lubricated bearing means for use in rotodynamic apparatus of the kind including a pair of spaced upper and lower rotodynamic machines, upright shafting interconnecting the machines and supported by the bearing means, the lubricated bearing means comprising a closed vessel adapted to permit the extension therethrough of the shafting and which includes upper and lower compartments for bearing lubricant and ducting interconnecting the compartments, upper and lower shaft-engaging bearing devices in the respective compartments, and a lubricant circulator having an inlet communicating with the lower compartment and an outlet communicating with the bearing devices, the arrangement being such that lubricant flows from the lower compartment through the bearing devices into the compartments and overflows from the upper compartment into the lower compartment.

Preferably the lubricant circulator is constituted by a pump.

Preferably the bearing means include a lubricant cooler in a line through which lubricant from the pump outlet passes to the bearing devices.

Preferably also the pump is in the lower compartment and includes a rotor on upright shafting in the compartment.

By virtue of the invention, the bearing means may be provided as a capsule in which the lubricant is sealed against contamination by dirt. However, the recirculatory flow of lubricant may proceed while the bearing devices remain flooded with lubricant so that the danger of dry running is eliminated or reduced.

The present invention is also rotodynamic apparatus of the aforesaid kind, including bearing means comprising a closed vessel through which the shafting extends and which includes upper and lower compartments for bearing lubricant and ducting interconnecting the compartments, upper and lower shaft-engaging bearing devices in the respective compartments, and a lubricant circulator having an inlet communicating with the lower compartment and an outlet communicating with the bearing devices, the arrangement being such that lubricant flows from the lower compartment through the bearing devices into the compartments and overflows from the upper compartment into the lower compartment.

Embodiments of the present invention will now be described by way of example with reference to the accompanying drawings in which.

Figure 1:
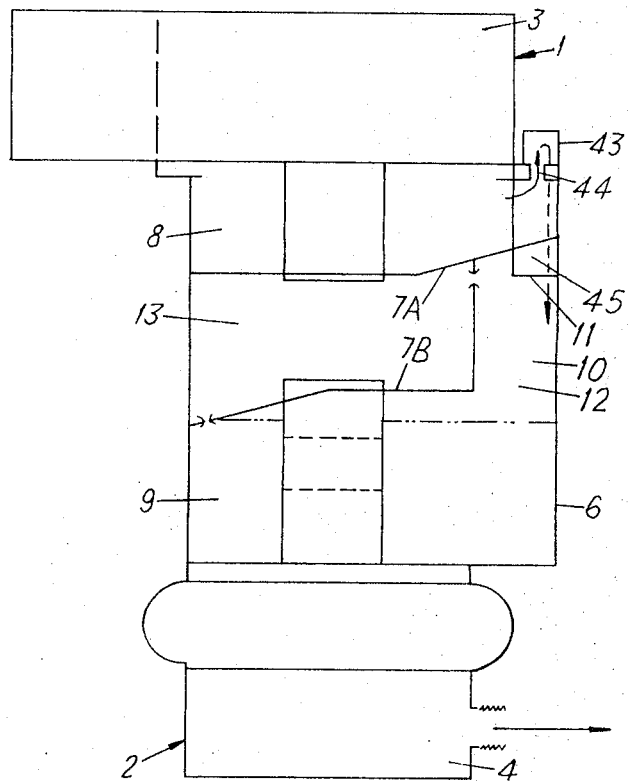
FIG. 1 shows a schematic side elevation of a steam turbine driven centrifugal pump including oil-lubricating bearing means according to the present invention.
Figure 2:
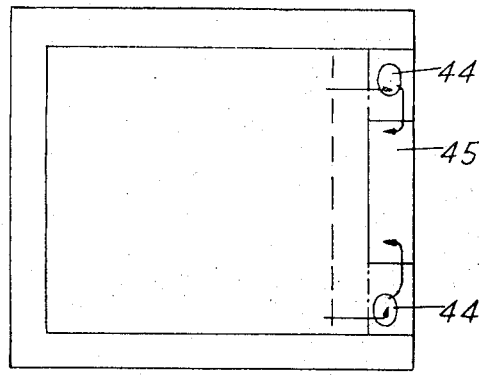
FIG. 2 shows schematically a plan view of the apparatus of FIG. 1.
Figure 3:
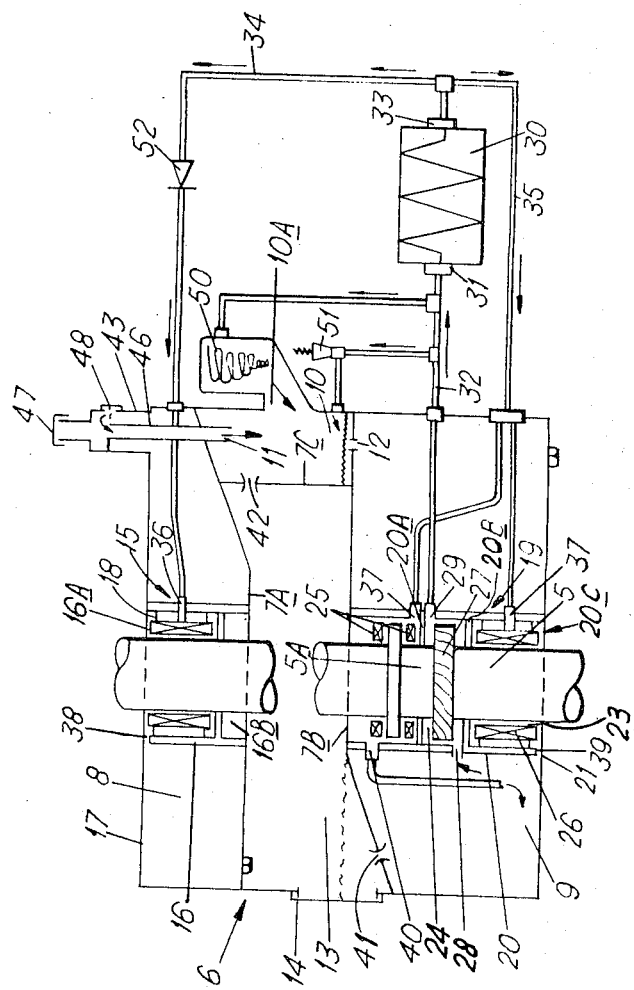
FIG. 3 shows in cross-sectional side elevation the oil-lubricating bearing means of FIG. 1 in greater detail.

Referring to FIGS. 1 to 3, rotodynamic apparatus for pumping the feed water of a ship's boiler comprises a pair of spaced upper and lower axially disposed machines 1, 2 (not shown in FIG. 3) having casings 3, 4, rotors (not shown) in the casings 3, 4, and upright shafting 5 (FIG. 3) drivingly interconnecting the rotors. The upper machine 1 is a pump and the lower machine 2 is a turbine to drive the pump.

Oil-lubricated bearing means for the shafting include a closed vessel 6 which may be in the form of rectangular box but other forms of vessel are possible for example cylindrical, interconnecting the casings 3, 4 of the machines and through which the shafting 5 extends. The interior of box 6 is divided by partitions 7A, 7B to provide a pair of spaced upper and lower closed compartments 8, 9 for oil, a rear closed compartment 10 extending between the upper and lower compartments 8, 9 to receive oil overflow from 11 extending the bottom wall 7A of the upper compartment 8 and to discharge the overflow through an opening 12 in the top wall 7B of the lower compartment 9, and a front closed compartment 13 having a removable front door 14 (FIG. 3) and housing trip gear (not shown) for the shafting 5.

Referring to FIG. 3, the upper compartment 8 has removably fitted therein an upper cartridge 15 including an upright cylindrical housing 16 bridging the top wall 17 and bottom wall 7A of the compartment 8, a shaft-engaging journal bearing 18 in the housing 16, and shaft seals (not shown) in the housing 16 at the ends 16A, 16B of the housing.

The lower compartment 9 has removably fitted therein a lower cartridge 19 which includes an upright cylindrical housing 20 bridging the top wall 7B and bottom wall 21 of the compartment 9 and has partitions 20A, 20B to provide top 22, bottom 23 and intermediate 24 casings; a shaft-supporting thrust bearing 25 in the top casing 22; a shaft-engaging journal bearing 26 in the bottom casing 23; an axial-screw rotor 27 fixed on the shaft portion 5A in the intermediate casing 24 which, with a bottom inlet 28 and a top outlet 29, forms with the rotor 27 an oil pump; and a shaft seal (not shown) in the housing 20 at the lower end 20C thereof.

An oil cooler 30 (FIG. 3) is mounted alongside the lower compartment 9 and has its inlet 31 connected by a supply line 32 to the oil-pump outlet 29 and has its outlet 33 connected by branch lines 34, 35 to oil inlets 36, 37 in the side walls of the housings 15, 19 so that cool oil passes to the bearings 18, 25, 26. Oil from the top journal bearing 18 passes into the upper compartment 8 through an aperture 38 in the housing 16 at the upper end 16A thereof, and oil from the bottom journal bearing 26 passes into the lower compartment 9 through an aperture 39 in the housing 20 at the lower end 20C thereof.

Figure 5:
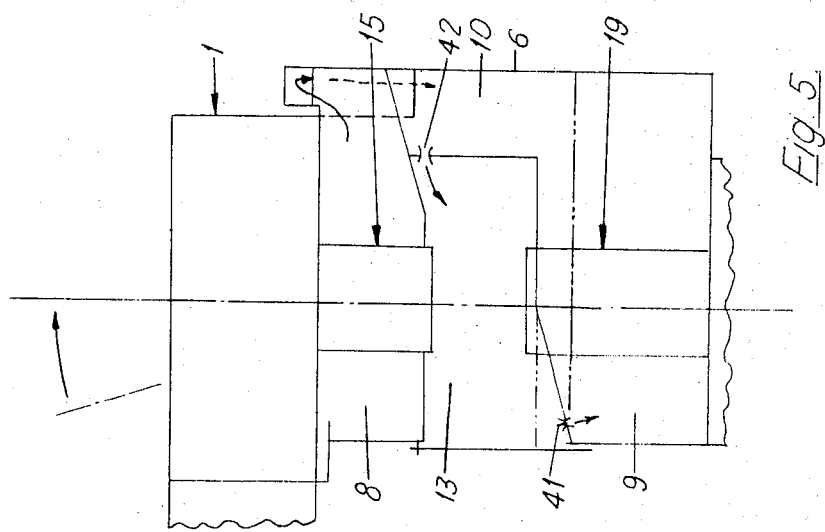
FIGS. 4 and 5 shows the operational characteristics of the apparatus of FIG. 1 under roll conditions, say when installed in a ship.
Figure 4:
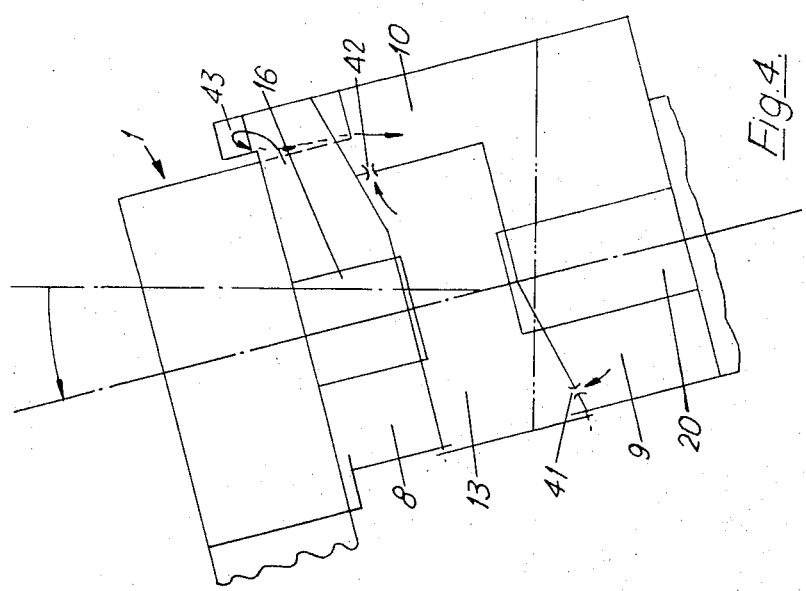

The oil level in the lower compartment 9 tends to fluctuate due to possible oil leakage and rolling of the ship (see FIGS. 4 and 5). It is a feature of this embodiment that the oil passes from the thrust bearing 25 into the lower compartment 9 through an aperture 40 (FIG. 3) in the housing 20 at a higher level than the bearings elements so that the bearing runs in a miniature oil bath and is therefore independent of the oil level in the lower compartment 9 under starting and stopping conditions.

The floor 7B of the front (trip) compartment 13 includes an aperture 41 for the passage of oil from the lower compartment 9 and there is provided at the top of the rear wall 7C of the compartment 13 a vent 42 to the ducting 10 for the passage of gas, whereby flow of oil is permitted into and from the front compartment 13 from the lower compartment 9 on rolling of the ship, the flow of oil or gas being indicated by arrows in FIGS. 4 and 5. The aperture 41 is near the outer edge of a front portion of the floor 7B and said portion is forwardly and downwardly sloped, whereby interchanging movement of oil between the lower compartment 9 and the front compartment 13 is facilitated. Also, the sloped portion of the floor 7B provides an enlarged front door opening at 14 which facilitates access to the front compartment 13 and the door 14 includes a sight glass.

To ensure efficient operation of the apparatus, said shaft seals are immersed in oil at all times. It is a feature of this embodiment that the upper portion of the ducting 10 interconnecting the upper and lower compartments 8, 9 consists of a weir 43 adapted to permit an overflow of oil from the upper compartment 8 at a level ensuring immersion of the adjacent seal at end 16A in oil. The weir 43 consists of an upstanding chamber on the top wall 17 of the upper compartment 8 with which the chamber communicates through the overflow opening 44 in the top wall 17. In the apparatus of FIGS. 1 and 2, a pair of openings 44 are provided communicating with a central inlet duct 45 of the ducting 10 extending downwards through the top compartment 8; while in the arrangement of FIG. 3 an upstanding tube 46 projects into the chamber 43 to form therewith a U-passage for the overflow and extends downwards through the upper compartment 8 to discharge into the rear compartment 10A which forms the lower portion of the ducting 10. The top of the chamber has a vent 47 (FIG. 3) and filling opening therein and the side of the chamber has a sight glass 48 therein. The level of the overflow is such as to provide an adequate head of oil above the top seal at 16A.

A rear portion of the bottom floor 7A of the upper compartment 8 is sloped rearwards and upwards to reduce the volume of the vessel 8.

A proportion of the pump discharge is bypassed through an oil filter 50 mounted alongside the rear compartment 10A and opening into same. Also, a relief valve 51 is provided in a bypass connecting the pump discharge 29 with the rear compartment 10A.

Figure 6:
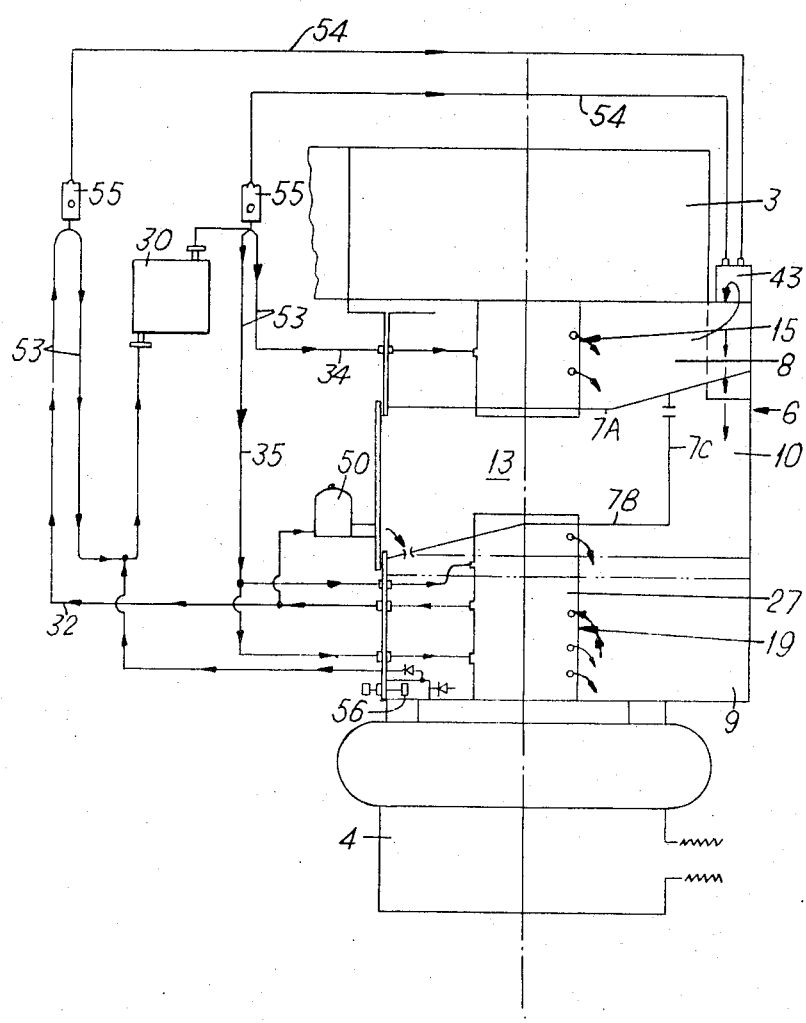
FIG. 6 shows in schematic side elevation the apparatus of FIG. 1, but including means ensuring retention of oil in a top bearing chamber of the apparatus.

So that the efficiency of the top seal at 16A may be maintained when the pump stops, means are provided which ensure retention of the oil in the upper compartment 8 on stoppage of the pump 27. In one form, shown in FIG. 3, said means consist of a non-return valve 52 in the branch line 34 to the upper bearing 18. In another form, shown in FIG. 6, said means consist of a pair of syphonic U-portions 53 in the pump discharge line, vent lines 54 connecting the U-bend of said portion of the lines with the weir chamber 43, and oil-actuable float valves 55 in the vent lines, the arrangement being such that on stoppage of the pump the valve float drops to admit gas from the weir chamber to the U-bends in the oil lines and said gas instantly breaks the syphonic flow of oil around the U-bends thereby leaving the upper compartment 8 full of oil. When the pump is restarted, and oil flows through the line 32, 34, 35, the gas in the line passes into the upper bearing 18 and is released between the bearing pads without affecting the operation of the pads.

To enable priming of the bearing means in the event that the oil in the upper compartment 8 has returned to the lower compartment 9, say during transit of the sealed capsule 6 to the ship for installation, a hand pump 56 (FIG. 6) provided in the lower compartment 9 delivers oil directly to the upper compartment 8 until the oil is visible at the sight glass 48 on the weir chamber 43.

With the bearing means ready for operation of the apparatus, the oil fills to capacity the upper and lower compartments 8, 9 and the oil cooler 30. On operation of the apparatus, the oil pump 27 in the lower compartment 9 of the bearing means is driven by the rotary shafting 5 and supplies cooled and filtered oil to the bearings 18, 25, 26, there being a recirculatory flow of oil from the bearings 18, 25, 26 into the upper and lower compartments 8, 9 and from the upper compartment 8 through the return ducting 10 to the lower compartment 9.

With the bearing means in the form of a closed capsule, ingress of dirt to the oil is positively prevented. Also, as the upper and lower compartments 8, 9 remain filled with oil during the recirculatory flow, the bearings 18, 25, 26 are constantly flooded so that safe running thereof is assured.

Figure 8:
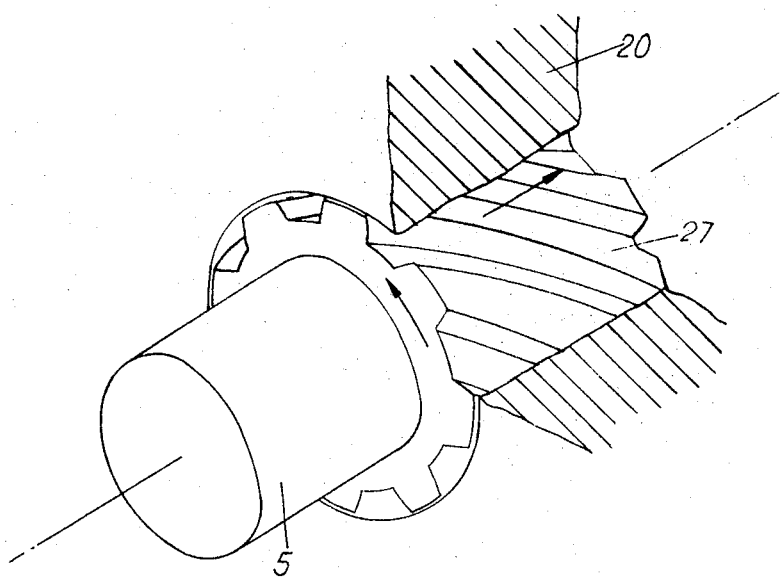
FIG. 8 shows a pictorial view of the pump of FIGS. 3 and 7.

The construction of the oil pump is simple as can be seen from FIG. 8. The rotor 27 is either integral with the shafting 5 or attached to it by suitable means, say by a shrink fit. The rotor 27 is finished with the shafting 5 to maintain a high order of concentricity. The stator is part of the bearings housing 20 and the clearances sized so that rubbing of the stator and rotor does not occur within the bearing clearance limits.

The lubricating pump is therefore of robust construction with the absolute minimum of parts, namely stator and rotor, and a considerable life may be expected since no contact takes place between these parts. Secondary lay shafts, couplings and reduction gears are not required.

The sealed capsule 6 is designed as a self-sustaining lubricated-bearing system which operates without external supply other than cooling water. The capsule 6 may be charged with oil and sealed prior to leaving the works, and is designed for a suitable minimum running life between lubricant changes. It should not be necessary to top up the oil level during this period, as provision is made for normal loss of oil.

Figure 7:
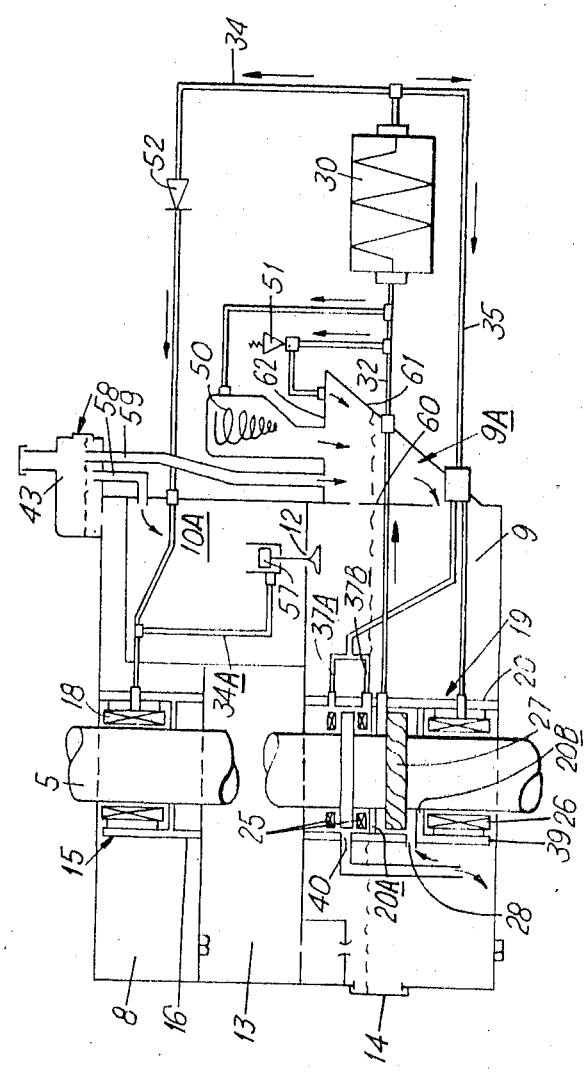
FIG. 7 shows in cross-sectional side elevation a modified form of oil-lubricating bearing means.

In another embodiment shown in FIG. 7, the foregoing embodiment is modified to provide for directed lubrication of the thrust bearing 25 under running conditions while ensuring reversion to flooded lubrication of the thrust bearing 25 under starting and stopping and fault conditions. In this modification, the oil level in the lower compartment 9 is, under running conditions, at the level of the partition 20A of the housing 20, oil being fed to the thrust bearing 25 through a pair of upper and lower branch inlets 37A, 37B and flowing from the bearing 25 through an outlet 40 at a level between the inlets 37A, 37B. This directed lubrication ensures lower power loss, a cooler bearing, a thicker oil film, and greater safety. The rear compartment 10A is formed as an oil storage vessel having its bottom outlet 12 fitted with a piston valve 57 spring-urged to an open position and maintained in closed position by the oil pressure in the branch duct delivering to the bearing 25, a suitable oil branch 34A being provided. The weir 43 includes a pair of standpipes 58, 59 extending to different levels in the chamber 43, the low-level standpipe 58 delivering to the storage vessel 10A and the high-level standpipe 59 delivering to a settling chamber 9A formed as a rearward extension of the lower compartment 9. The front wall 60 of the settling chamber is a baffle plate to inhibit air entrainment, and the rear wall 61 is rearwardly and upwardly sloped to assist sedimentation. The flows through the relief valve 51 and the filter 50 pass into the settling chamber 9A through the top wall 62 thereof.

In operation of the apparatus of FIG. 7, at start all the bearings 18, 25, 26 are flooded and the storage vessel 10A is empty, with its outlet valve 57 open. When the oil pump 27 starts up, the outlet valve 57 closes and oil from the upper compartment 8 flows down the low-level standpipe 58 into the storage vessel 10A to fill same, whereupon oil flows down the high level standpipe 59 into the settling chamber 9A. The filling of the storage vessel 10A causes the oil in the lower compartment 8 to fall to its low level, i.e. to partition 20A, so that the thrust bearing 25 is lubricated solely by oil streams directed into bearings through inlets 37A, 37B. On stoppage of the oil pump 27 or under fault conditions, such as low oil pressure, the outlet valve 57 opens under spring action to permit flow of oil from the storage vessel 10A into the lower compartment to fill same and so flood the thrust bearing 25. An intermediate oil gutter 62 is provided between the trip and lower compartments 13, 9. While in the above described embodiments, oil was used as the lubricant, it will be understood that other liquids such as for example water, could be used: and indeed the described arrangements could be adapted for a gas or vapour as lubricant.

I claim:

1. Lubricated bearing apparatus for use in rotodynamic apparatus of the kind including a pair of spaced upper and lower rotodynamic machines, upright shaft interconnecting the machines and supported by the bearing means, the lubricated bearing apparatus comprising a closed vessel adapted to permit the extension therethrough of the shaft and which includes upper and lower compartments for bearing lubricant and oil return ducting interconnecting the compartments, upper and lower shaft-engaging bearing devices in the respective compartments, and a lubricant circulator having an inlet communicating with the lower compartment and an outlet communicating with the bearing devices, an intermediate shaft access compartment between the upper and lower compartments, a lubricant reservoir at the floor of the intermediate compartment to one side of the axis of the shaft, and an aperture in said floor to permit through flow of lubricant between the lower compartment and the reservoir of the intermediate compartment, the arrangement being such that lubricant flows from the lower compartment through the bearing devices into the compartments, lubricant overflowing from the upper compartment into the lower compartment via said ducting.

2. Lubricating bearing apparatus according to claim 1, wherein the floor of the intermediate compartment has a sloping outer end to provide said lubricant reservoir and to improve access to the compartment.

3. Lubricated bearing apparatus according to claim 2, wherein a rear wall of the intermediate chamber separates the chamber from said ducting and includes an aperture to permit the through passage of gas between the intermediate chamber and the ducting.

4. Sealed lubricated bearing apparatus for use with rotodynamic apparatus of the kind including a pair of vertically spaced driving and driven machines which are drivingly connected, and bearing means for the machines, the sealed lubricant bearing apparatus comprising a closed vessel, having top and bottom end walls, a vertical shaft extending through the vessel and coupled to rotating members of the driving and driven machines so that the shaft drivingly couples the machines, the end walls of the vessel including apertures for the shaft, upper and lower compartments in the vessel for bearing lubricant, upper and lower shaft, engaging bearing devices in the respective compartment so as to be immersed in bearing lubricant in the compartment, the bearing devices constituting said bearing means and serving to radially and axially locate the shaft, a lubricant circulator having an inlet communicating with the lower compartment and an outlet communicating with the bearing devices, a lubricant return duct for return of lubricant from the upper compartment to the lower compartment, shaft seals at the bearing devices to prevent lubricant leakage from the compartment via said apertures, a lubricant storage compartment, a fluid conduit supplying lubricant to said storage compartment from the upper compartment, said storage compartment being in fluid communicating with said lower compartment by means of a valve controlled outlet, and valve control means being provided automatically operable to close said outlet during normal running of the machines when the speed of the machines is above a predetermined value so that the level of lubricant in the lower compartment is lowered to a desired value whereby at least a portion of the lower compartment bearing device is non-immersed and whereby said valve is opened when the speed of the machines falls below said predetermined value to completely immerse the lower bearing device.

5. Sealed lubricant bearing apparatus according to claim 4, wherein said portion of the lower compartment bearing device which is non-immersed during normal operation of the machine, comprises a thrust bearing serving for axial location of the shaft.

6. Sealed lubricated bearing apparatus according to claim 4, wherein the end walls of the vessel are adapted for supporting relationship with the driving and driven machines.

7. Sealed lubricating bearing apparatus according to claim 4, wherein an intermediate shaft access compartment is provided between the upper and lower compartments, an oil reservoir is located at the floor of the intermediate compartment to one side of the shaft axis and an aperture is provided in said floor to permit throughflow of oil between the lower compartment and the reservoir of the intermediate compartment.

8. Sealed lubricated bearing apparatus according to claim 4, wherein the bearing device of the lower compartment includes a lubricant discharge located above the device to ensure satisfactory immersion of the device.

9. Sealed lubricated bearing apparatus according to claim 4, wherein said valve control means is fluidly connected to the lubricant circulator outlet so as to be operable by the pressure of the lubricant, whereby said valve controlled outlet is closed when the pressure of the lubricant is above a predetermined value and is opened when the lubricant pressure falls below the predetermined value.

10. Sealed lubricating bearing apparatus according to claim 9, wherein the valve control means comprise a fluid operable piston-and-cylinder device for valve closure, the operating fluid for which device is constituted by lubricant discharge from the lubricant circulator, and resilient means to urge the valve into an open position.

11. Sealed lubricating bearing apparatus according to claim 4, wherein the return ducting and the fluid conduit are so arranged that the storage compartment is filled prior to the delivery of lubricant from the upper compartment to the lower compartment through the return duct.

12. Sealed lubricating bearing apparatus according to claim 4, wherein the return ducting discharge into an inlet chamber beside the lower compartment and in fluid communication therewith, a baffle device being provided separating the inlet chamber from the lower compartment and serving to inhibit air entrainment in the lubricant.

13. Sealed lubricating bearing apparatus according to claim 4, wherein means are provided to ensure retention of lubricant in the upper compartment on stoppage of pump.

14. Sealed lubricated bearing apparatus according to claim 4, wherein the lubricant circulator is comprised by a pump located in the lower compartment and includes a rotor on the shaft in the compartment.

15. Sealed lubricated bearing apparatus according to claim 4, wherein an overflow weir is located above the upper compartment received bearing lubricant from the upper compartment and discharging into said ducting, the weir ensuring that the upper compartment is satisfactorily filled.

16. Sealed lubricated bearing apparatus according to claim 4, wherein an upright housing is removably located in each of the upper and lower compartments and serves to house the bearing device of the compartment.

17. Rotodynamic apparatus comprising a pair of vertical spaced driving and driven machines drivingly coupled together; bearing means for the machines; and a sealed lubricated bearing system located between the machines in supporting relationship therewith and comprising a closed vessel, having top and bottom end walls, a vertical shaft extending through the vessel and coupled to rotating members of the driving and driven machines so that the shaft drivingly couples the machines, the end walls of the vessel including apertures for the shaft, upper and lower compartments in the vessel for bearing lubricant, upper and lower shaft, engaging bearing devices in the respective compartment so as to be immersed in bearing lubricant in the compartment, the bearing devices constituting said bearing means and serving to radially and axially locate the shaft, a lubricant circulator having an inlet communicating with the lower compartment and an outlet communicating with the bearing devices, a lubricant return duct for return of lubricant from the upper compartment to the lower compartment, shaft seals at the bearing devices to prevent lubricant leakage from the compartment via said apertures, a lubricant storage compartment, a fluid conduit supplying lubricant to said storage compartment from the upper compartment, said storage compartment being fluid communicating with said lower compartment by means of valve controlled outlet, and valve control means being provided automatically operable to close said outlet during normal running of the machines when the speed of the machines is above a predetermined value so that the level of lubricant in the lower compartment is lowered to a desired value whereby at least a portion of the lower compartment bearing device is non-immersed and whereby said valve is opened when the speed of the machine fails below said predetermined value to completely immerse the lower bearing device.

* * * * *